United States Patent Office 3,300,542

Patented Jan. 24, 1967

3,300,542

FOOD RELEASE COATING

Ronald O. Hadlock, Greensboro, N.C., assignor to Dow Corning Corporation, Midland, Mich., a corporation of Michigan No Drawing. Filed May 19, 1964, Ser. No. 368,696
6 Claims. (Cl. 260—825)

This invention relates to new compositions particularly designed for use by housewives on cooking utensils.

It has been known for many years that organo-siloxanes are good release agents for bread and other pastries. In general, a siloxane resin is applied to the pan or other cooking utensil and the resin is then cured by heating. Food cooked against the cured resin film will release easily without the necessity of using organic greases. This discovery led to a major improvement in commercial bakeries and at the present time most of the commercial bread baked in the United States is baked in pans coated with silicone resins. U.S. Patent 2,606,510 is the basic patent on this process.

Whereas the heretofore employed siloxane resins have been outstandingly successful when used in commercial baking operations, they have not proved satisfactory for use by housewives in the home. One reason is that the heretofore used siloxane resins are relatively difficult to cure. Whereas this is no obstacle in a commercial pan coating establishment, it is an obstacle to home use for the average housewife has neither the time, facilities or inclination to go through the rather involved curing process necessary. Furthermore, the heretofore used commercial siloxane resins coatings are limited in the type of foods that can be satisfactorily released from the surface. In fact, they are used almost exclusively for loaf bread, rolls and certain types of cakes. Consequently, it is highly desirable to provide a composition for home use which is easy to cure and which releases the widest possible types of foodstuff.

It has also been suggested as shown in U.S. Patent 2,462,242, that silicone greases can be used in lieu of organic greases for release of food. This method, however, suffers from the obvious disadvantage that one is merely substituting one type of grease for another and even though the silicone grease is thermally stable, it does not form a durable film on the cooking utensil and thus has to be reapplied every time the pan is cleaned. In addition, it has been suggested in U.S. Patent 2,793,197 that release of foodstuffs could be obtained by employing mixtures of a rubbery siloxane coating and a fluid siloxane. The primary difficulty with this suggestion is that the coatings rapidly deteriorate due to absorption of oils and greases from the foodstuff into the film. Once the film has deteriorated, it no longer gives proper release.

It is the object of this invention to provide a resinous siloxane composition which can be easily cured by a housewife on a cooking utensil and which will give release from almost every type of foodstuff one would want to cook. Another object is to make cooking utensils far more easily cleaned from charred grease and other organic material than is normally obtained. Another object is to provide a release coating which can be readily repaired by the mere application of more material in case the coating is ruptured. Other objects and advantages will be apparent from the following description.

This invention relates to a composition consisting essentially of (1) from 10 to 35 percent by weight based on the combined weights of (1) and (2) of a fluid methylpolysiloxane having a hydroxyl content of at least 2 percent by weight, (2) from 65 to 90 percent by weight based on the weights of (1) and (2) of a phenylsiloxane resin having a hydroxyl content of at least 3 percent by weight and having a phenyl to silicon ratio of at least .2 and a total hydrocarbon to silicon ratio of from 1.2 to 1.7 inclusive and (3) a stannous salt of a carboxylic acid compatible with (1) and (2) in amount of at least 1 part tin per 150 parts of the combined weight of (1) and (2).

Ingredient (1) of the compositions of this invention is a methylpolysiloxane fluid having a silicon-bonded hydroxyl content of at least 2 percent by weight. This limitation is critical in that fluids having hydroxyl contents below this figure are not operative in this invention. Methylpolysiloxane fluids containing silicon-bonded hydroxyl groups are well-known articles of commerce and can be prepared by any of the conventional methods. For the purpose of this invention, the fluid can be either linear or branched in structure and can contain any combination of $(CH_3)_nSiO_{4-n/2}$ units in which $n$ is an integer from 1 to 3 inclusive provided the fluid has at least the required hydroxyl content. The fluid can also contain limited amounts of $SiO_{4/2}$ units.

Resin (2) must contain on the average at least .2 phenyl groups per silicon atoms and must have an average of from 1.2 to 1.7 total hydrocarbon groups per silicon atom. All of the hydrocarbon substituents in the resin can be phenyl but preferably there are combinations of phenyl radicals and other hydrocarbon radicals such as methyl or ethyl. Preferably, the remaining radicals are methyl. Resin (2) must have a hydroxyl content of at least 3 percent by weight. Such resins can be prepared by well-known techniques.

Within the purview of the above limitations, (2) can contain any combination of the following siloxane units: $PhSiO_{3/2}$, $Ph_2SiO$, $PhRSiO$, $RSiO_{3/2}$, $R_2SiO$, $R_3SiO_{1/2}$, $PhR_2SiO_{1/2}$, $Ph_2RSiO_{1/2}$ and $SiO_{4/2}$ where Ph is the phenyl radical and R is a hydrocarbon radical such as a lower alkyl radical.

The third essential ingredient in the composition of this invention is the catalyst which can be any stannous salt of a carboxylic acid provided the salt is compatible with (1) and (2). By compatible with (1) and (2) is meant that the salt is either soluble in a combination of (1) and (2) per se or is soluble in a mutual solvent for the salt and (1) and (2). In order to be effective, there should be at least 1 part by weight tin per 150 parts by weight of (1) and (2). There is no critical upper limit.

The best method of applying the compositions of this invention to the surface of a cooking utensil is by employing a solution in a suitable solvent in which the percent by weight of (1) and (2) is less than 10 percent of the total weight of the solution. Any suitable solvent can be employed. These include petroleum ethers, toluene, xylene, and chlorinated solvents such as perchloroethylene, 1,1,1-trichloroethane, and methylene chloride. It is obviously preferred to employ a nontoxic, noninflammable solvent inasmuch as this product is designed primarily for household use. However, the invention is not in any way limited to the use of such solvents.

The compositions of this invention can be applied to the cooking utensil by any convenient manner such as by painting, dipping or spraying. These compositions are particularly adaptable for packaging in aerosol containers from which they can be uniformly sprayed on the cooking surface.

The compositions of this invention are applicable to any type of cooking surface such as steel, copper, aluminum, ceramic, tin, magnesium and the like.

The composition of this invention can also be employed with any type of foods such as bread, cake, eggs, meats, vegetables, or combinations thereof.

A specific formulation which is useful and which illustrates this invention is as follows:

3 percent by weight phenylmethylsiloxane resin containing 3.5 percent by weight silicon-bonded hydroxyl groups and having a phenyl to silicon ratio of .56 and a methyl to silicon ratio of .79, 0.5 percent of a methylsiloxane fluid containing 3.5 percent by weight silicon-bonded hydroxyl groups and 96.5 percent by weight 1,1,1-trichloroethane. This composition contained 1 part by weight tin per 100 parts by weight total siloxane, the tin being in the form of stannous octoate containing 14.15 percent by weight tin.

The following examples are illustrative only and should not be construed as limiting the invention which is properly delineated in the appended claims.

*Example 1*

The above formulation was applied to various cooking utensils shown below in a thin, even film and allowed to dry for 10 minutes. The coating was then cured at 350° F. for 20 minutes. This material was applied to the following utensils: stainless steel nonelectric fry pans, aluminum nonelectric fry pans, heavy iron nonelectric fry pans, iron electric frying pans and a ceramic baking dish. In these utensils the following kinds of food were cooked with excellent release: eggs, pork, veal, ground beef, gravy, casseroles, tomato-containing spaghetti, bacon, pancakes and fried chicken. Not only did the food release easily but the pans could be easily cleaned of residual material even though it was thoroughly charred on the surface of the utensil. The latter is one of the major advantages of the compositions of this invention in that they reduce the work necessary to clean dirty cooking utensils, since burnt residue can be easily removed with detergent without the necessity of scouring the pan with an abrasive.

In utilizing utensils coated with the compositions of this invention, one should avoid the use of abrasive materials in order to prevent rupturing the coating and care should be exercised in using metallic spatulas for the same reason. However, if the coating is ruptured for any reason, it is easily repaired by applying additional composition over the rupture and then curing the film by the above method.

*Example 2*

Excellent release is obtained when the following phenylsiloxane resin is substituted for (1) above. A resin having 3 percent by weight silicon-bonded hydroxyl groups, a phenyl to silicon ratio of 1 and a methyl to silicon ratio of .5 to 1.

*Example 3*

Equivalent results are obtained when the following catalysts are employed in Example 1 in place of stannous octoate, in amount of 1 part tin per 100 parts total siloxane:

stannous naphthenate
stannous linoleate
stannous isobutyrate
stannous oleate
stannous stearate
stannous benzoate
stannous naphthoate
stannous laurate stannous o-thymate
stannous β-benzoyl-propionate
stannous crotonate
stannous tropate
stannous p-bromobenzoate
stannous palmitoleate
stannous cinnamate
and the stannous salt of phenyl acetic acid.

That which is claimed is:

1. A composition consisting essentially of a mixture of (1) from 10 to 35 percent by weight of a fluid methylpolysiloxane of the unit formula $(CH_3)_nSiO_{4-n/2}$ in which $n$ is an integer from 1 to 3 inclusive and having a silicon-bonded hydroxyl content of at least 2 percent by weight, (2) from 65 to 90 percent by weight of a phenylpolysiloxane resin having a silicon-bonded hydroxyl content of at least 3 percent by weight and having a phenyl to silicon ratio of at least .2 and a total hydrocarbon to silicon ratio of from 1.2 to 1.7, and (3) as a catalyst a stannous salt of a carboxylic acid compatible with (1) and (2) in amount of at least 1 part tin per 150 parts of the combined weights of (1) and (2).

2. A composition in accordance with claim 1 in which (2) is a phenylmethylpolysiloxane resin.

3. A composition consisting essentially of a solution in an organic solvent of less than 10 percent by weight based on the weight of the solution of a mixture of (1) from 10 to 35 percent by weight of a fluid methylpolysiloxane of the unit formula $(CH_3)_nSiO_{4-n/2}$ in which $n$ is an integer from 1 to 3 inclusive and having a silicon-bonded hydroxyl content of at least 2 percent by weight, (2) from 65 to 90 percent by weight of a phenylpolysiloxane resin having a silicon-bonded hydroxyl content of at least 3 percent by weight and having a phenyl to silicon ratio of at least .2 and a total hydrocarbon to silicon ratio of from 1.2 to 1.7, and (3) as a catalyst a stannous salt of a carboxylic acid compatible with (1) and (2) in amount of at least one part tin per 150 parts of the combined weights of (1) and (2).

4. A solution in accordance with claim 3 in which (2) is a phenylmethylpolysiloxane resin.

5. A cooking utensil in which at least the cooking surfaces thereof are coated with the cured composition of claim 1.

6. A cooking utensil, at least the cooking surfaces thereof being coated with a cured composition of claim 2.

References Cited by the Examiner

UNITED STATES PATENTS

| | | | |
|---|---|---|---|
| 2,833,735 | 5/1958 | Nitzsche et al. | 260—825 |
| 3,002,946 | 10/1961 | Thomas | 260—825 |
| 3,070,555 | 12/1962 | Bruner | 260—825 |

SAMUEL H. BLECH, *Primary Examiner.*